UNITED STATES PATENT OFFICE.

ARTHUR A. LIBBY, OF CHICAGO, ILLINOIS.

IMPROVEMENT IN PRESERVING RAW MEAT.

Specification forming part of Letters Patent No. 213,826, dated April 1, 1879; application filed January 29, 1879.

*To all whom it may concern:*

Be it known that I, ARTHUR A. LIBBY, of Chicago, in the State of Illinois, have invented certain new and useful Improvements in the Process of Preserving Raw Meat; and I do hereby declare that the following is a full, clear, and exact description thereof, which will enable others skilled in the art to which it appertains to make and use the same.

My invention relates to the preservation of meats in the raw state, and to the retention of the juices of the same when thus prepared.

It consists especially in the destruction of the germs of fermentation existing in the can or box in which the meat is contained and in the meat itself.

I take the meat after it has been properly dressed, cut in pieces of the desired size, and then dip it in, or coat it with, an adhesive or sticky substance, such as glue, gum, or glycerine, and then place the meat thus prepared in an ordinary can or box, so that the meat shall preferably have no contact with the sides, top, or bottom of the interior of the can. I next use a coating of bisulphite of lime or salicylic acid with the gum, &c.

The entire interior of the can or box is first prepared by being carefully coated with glue or gum or glycerine. When thus prepared, and when the meat, also prepared as described, is placed in the can in the manner above set forth, I then hermetically seal the can or box, and place it where it may be left for a certain length of time without disturbance. (The time varies somewhat, according to the conditions and temperature of the atmosphere at the time of packing.) The time during which I place the can aside without disturbance is from three to twelve days. The ferment of the air thus left in a closed chamber, coated as stated, in substantially the time herein given, is in a condition to deposit and render it fixed in the sticky substances covering the meat and interior of the can or box, and so to lose its capacity of engendering and promoting the destruction of the animal tissue.

I do not claim to be the discoverer of the fact that the air left stationary in a closed coated chamber will lose its capacity for promoting decomposition in animal or vegetable matter; nor do I claim the coating of a can for the preservation of the surface of the metal of the can.

What I claim as my invention, and desire to secure by Letters Patent, is—

The process of preserving the air in a state not promotive of fermentation around raw meat in ordinary hermetically-sealed cans or boxes, which consists in coating the said meat with a solution of bisulphite of lime, salicylic acid, and some adhesive gummy substance, coating the interiors of the cans or boxes also with the adhesive or gummy substance, then preferably placing the coated meat in the cans or boxes without contact with the interiors of the same, and then placing the cans or boxes and contents so that they will not be disturbed until the germs of fermentation are deposited, the whole as herein described.

In testimony that I claim the foregoing as my own I affix my signature in presence of two witnesses.

ARTHUR ALBION LIBBY.

Witnesses:
LUTHER CHAD YOUNG,
ROBERT ALEXANDER STITT.